United States Patent
Pham (10) Patent No.: US 10,527,140 B2
(45) Date of Patent: Jan. 7, 2020

(54) COMPACT ARTICULATION MECHANISM

(71) Applicant: SCHLUMBERGER TECHNOLOGY CORPORATION, Sugar Land, TX (US)

(72) Inventor: Hau Nguyen-Phuc Pham, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/318,509

(22) PCT Filed: Jun. 26, 2015

(86) PCT No.: PCT/US2015/037865
§ 371 (c)(1),
(2) Date: Dec. 13, 2016

(87) PCT Pub. No.: WO2016/003785
PCT Pub. Date: Jan. 7, 2016

(65) Prior Publication Data
US 2017/0130808 A1    May 11, 2017

Related U.S. Application Data

(60) Provisional application No. 62/019,294, filed on Jun. 30, 2014.

(51) Int. Cl.
*B65G 65/32*    (2006.01)
*E04H 7/22*    (2006.01)
(Continued)

(52) U.S. Cl.
CPC ............. *F16H 25/20* (2013.01); *B65D 88/32* (2013.01); *B65G 65/32* (2013.01); *E04H 7/22* (2013.01);
(Continued)

(58) Field of Classification Search
CPC ...... F16H 25/20; F16H 25/22; F16H 25/2247; F16H 2025/0231; F16H 2025/2034;
(Continued)

(56) References Cited

U.S. PATENT DOCUMENTS 2,673,712 A * 3/1954 Loock ................. E21B 7/021
173/146
2,686,040 A * 8/1954 Lear .................... E21B 7/022
173/191
(Continued)

FOREIGN PATENT DOCUMENTS

CN     2657344 Y     11/2004

OTHER PUBLICATIONS

International Search Report issued in International Patent Application No. PCT/US2015/037865 dated Sep. 22, 2015; 3 pages.
(Continued)

*Primary Examiner* — Jessica L Laux (57) ABSTRACT

An articulation mechanism for large scale mobile aggregate system equipment. The mechanism includes a screw device that is pivotally secured to an elongated portion of the equipment to drive its movement to and from a collapsed position. The screw device is driven by a screw jack and moved within a housing while the housing itself is pivotally secured to another portion of the equipment. Rollers within the housing may be used to stabilize the lateral movement of the screw device during the opening, closing or self-locking of the elongated portion by the mechanism.

13 Claims, 7 Drawing Sheets

(51) Int. Cl.
*F16H 25/20* (2006.01)
*B65D 88/32* (2006.01)
*E21B 43/267* (2006.01)

(52) U.S. Cl.
CPC .... *E21B 43/267* (2013.01); *B65G 2814/0326* (2013.01); *F16H 2025/2031* (2013.01)

(58) Field of Classification Search
CPC .............. E04H 7/22; B65G 2814/0264; B65G 2814/0326; B65G 65/30; B65G 65/32; B65G 65/36; B65G 65/38; B65G 65/46; E21B 43/267
See application file for complete search history.

(56) References Cited

U.S. PATENT DOCUMENTS

| | | | |
|---|---|---|---|
| 3,206,994 A * | 9/1965 | Angsten | ................ F16H 25/20 74/89.37 |
| 4,465,420 A | 8/1984 | Dillman | |
| 4,855,960 A | 8/1989 | Janssen et al. | |
| 6,474,926 B2 | 11/2002 | Weiss | |
| 6,939,031 B2 | 9/2005 | Pham et al. | |
| 7,258,522 B2 | 8/2007 | Pham et al. | |
| 7,278,816 B2 * | 10/2007 | Marmur | ................ B60P 1/6463 414/491 |
| 8,926,252 B2 * | 1/2015 | McIver | ................ B60P 1/6427 414/332 |
| 2002/0141851 A1 | 10/2002 | Weiss | |
| 2003/0079883 A1 | 5/2003 | McCulloch et al. | |
| 2009/0008110 A1 * | 1/2009 | Osadchuk | ................ E21B 7/02 173/1 |
| 2014/0041322 A1 | 2/2014 | Pham et al. | |

OTHER PUBLICATIONS

Written Opinion issued in International Patent Application No. PCT/US2015/037865 dated Sep. 22, 2015; 4 pages.
Search Report issued in Chinese Patent Appl. No. 201580035662.5 dated Sep. 5, 2018; 8 pages (with English translation).

* cited by examiner

COMPACT ARTICULATION MECHANISM

CROSS REFERENCE TO RELATED APPLICATION(S)

This Patent Document claims priority under 35 U.S.C. § 119(e) to U.S. Provisional Application Ser. No. 62/019,294, entitled Compact Actuated Self-Locking Mechanism for Lifting and Lowering Heavy Articulated Structures, filed on Jun. 30, 2014, which is incorporated herein by reference in its entirety.

BACKGROUND

Exploring, drilling and completing hydrocarbon and other wells are generally complicated, time consuming and ultimately very expensive endeavors. As a result, over the years, well architecture has become more sophisticated where appropriate in order to help enhance access to underground hydrocarbon reserves. For example, as opposed to wells of limited depth, it is not uncommon to find hydrocarbon wells exceeding 30,000 feet in depth. Furthermore, today's hydrocarbon wells often include deviated or horizontal sections aimed at targeting particular underground reserves. Indeed, at targeted formation locations, it is quite common for a host of lateral legs and fractures to stem from the main wellbore of the well toward a hydrocarbon reservoir in the formation.

The above described fractures may be formed by a fracturing operation, often referred to as a stimulation operation. The stimulation or fracturing operation, involves pumping of a fracturing fluid at high pressure into the well in order to form the fractures and stimulate production of the hydrocarbons. The fractures may then serve as channels through the formation through which hydrocarbons may reach the wellbore. The indicated fracturing fluid generally includes a solid particulate referred to as proppant, such as sand. The proppant may act to enhance the formation of fractures during the fracturing operation and may also remain primarily within fractures upon their formation. In fact, the fractures may remain open in part due to their propping open by the proppant.

The above described proppant for the fracturing operation may be supplied from a proppant delivery unit located at the oilfield near the well. This unit is generally very large due to the amount of proppant that may be required for any given fracturing operation. For example, where the proppant is a conventional dry sand, a fully loaded unit may exceed half a million pounds in weight. Once more, as wells become deeper and of ever increasing complex architecture, efforts to provide even larger ready supplies of proppant at the oilfield are increasingly common. That is, more downhole fracturing locations may be involved, thus requiring a greater available supply of proppant.

From an equipment standpoint, greater on-site or near-site supplies of proppant may include the use of mobile silos or even larger stationary silos that are used to gravity feed a blender therebelow. Thus, a proppant slurry may be formed and utilized in short order to support various fracturing operations. As a practical manner, however, this means that potentially several million pounds of proppant may require transport and storage at a given location. Adding to this is the weight and footprint issues for the equipment itself which is necessary to allow for such a ready bulk supply.

In terms of limiting the overall footprint, a variety of systems may be available. For example, systems may be utilized in which smaller silo-like storage containers are transported to the oilfield and then erected to a vertical position. Thus, the footprint of the equipment may be reduced due to the vertical orientation and follow-on gravity feeding, mixing and use of a frac slurry may ensue.

Unfortunately, while this does address footspace issues to a degree, erecting a proppant loaded silo has its practical limitations. For example, erecting more than a few million pounds of a proppant filled silo may be impractical with conventionally available hydraulics. Thus, on larger job sites with more fracturing operations, the need to deliver several such small loaded silos may exist.

As an alternative to delivering small loaded silos, efforts have been undertaken to install larger, more permanent silos that may be empty when installed but subsequently filled with proppant for use at the oilfield. Again, the vertical orientation of such on-site silos helps keep footspace devoted to fracturing equipment to a minimum. Once more, such larger silos may be gravity fed and outfitted with mixing equipment and other features therebelow for ongoing operational use. However, setting up and filling these larger silos with proppant may come with challenges as well.

For example, in order to maximize efficiencies in terms of set up time and filling, unique modular forms of equipment may be employed. More specifically, a mobile compacted silo base frame may be positioned at the oilfield with a truck, unfolded and utilized as the foundation for the erection of a multi-unit silo thereover. Similarly, mobile compacted elevators with extendable auger arms may be positioned at the oilfield with another truck, vertically erected, and later utilized to transfer proppant from delivery trucks to the silo. In this way, a much greater amount of proppant may be made available at the oilfield site in a space saving fashion.

The process of unfolding the silo base frame or extending the auger arms face the unique challenge of re-orienting or articulating several thousand pounds of tension within a compact limited space of operation. That is, unlike erecting an elevator to a vertical position, the space for accommodating large scale hydraulics is unavailable for wings of the silo base frame and/or the auger arms.

SUMMARY

An articulation mechanism is provided as a support to a hinge at an interface between elongated portions of oilfield aggregate delivery equipment. The mechanism includes a screw device that has one end pivotally secured to a first of the elongated portions but insecure at an opposite end thereof. A housing is additionally provided about the screw device and is located between the device ends for stably accommodating the device therethrough. Thus, it is the housing that is secured to a second of the elongated portions. Further, a screw jack may be coupled to the housing between the ends of the device for sake of lateral and substantially locking engagement therewith.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain embodiments of compact articulation mechanisms utilized in aggregate management equipment. Specifically, equipment for the transport, delivery and storage of oilfield proppant is discussed which utilizes such articulation mechanisms to support joints at large base frame units which in turn support large scale silos as well as at auger units to support the extension of auger arms for proppant delivery. However, other uses for such compact articulation mechanisms may be employed. For example, outrigger support frames, ramps, fracturing blender assemblies and other heavy jointed oilfield equipment may incorporate embodiments of such articulation mechanisms. Indeed, so long as the mechanism incorporates a screw jack and screw device that substantially locks and in which one end of the device is pivotally secured to one of the elongated portions defining the joint but the other end is left insecure, appreciable benefit may be realized. That is, a unique compactness may be provided with such configurations where the other of the elongated portions defining the joint is instead pivotally secured to a housing about the device as detailed herebelow.

Figure 1A:
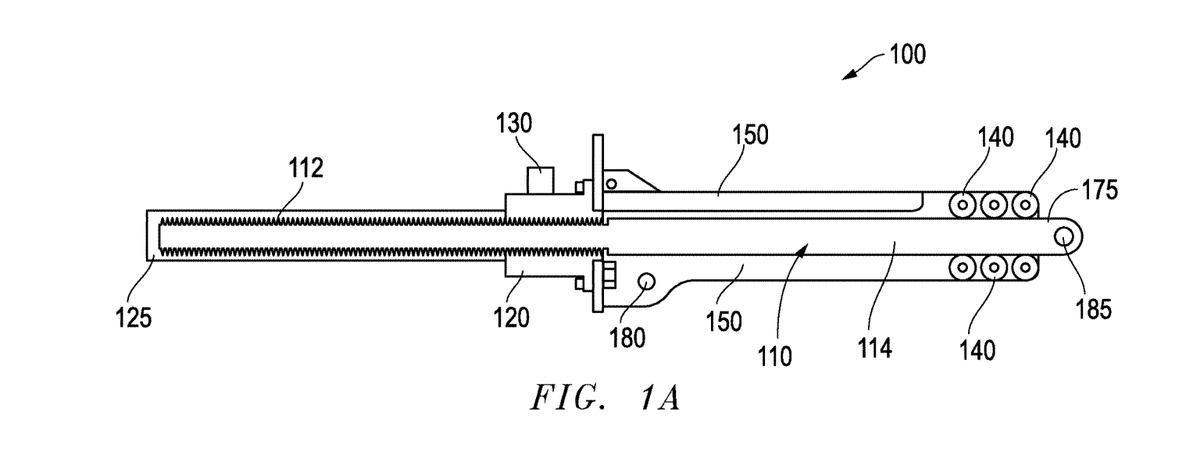
FIG. 1A is a side partially-sectional view of an embodiment of a compact articulation mechanism with a screw device thereof in a retracted lateral position.
Figure 1B:
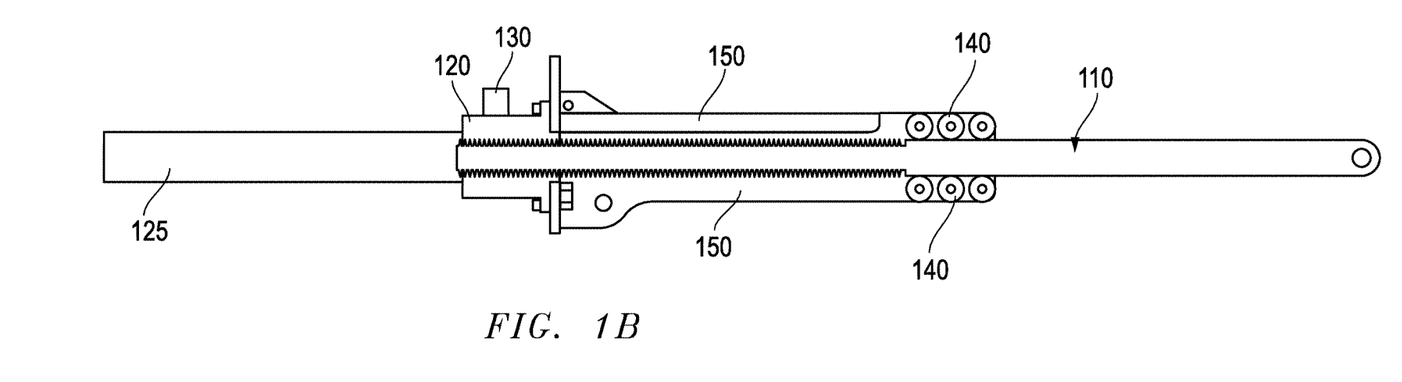
FIG. 1B is a side partially-sectional view of the articulation mechanism of FIG. 1A with the screw device in an extended lateral position.

Referring now to FIGS. 1A and 1B, a side partially-sectional view of an embodiment of a compact articulation mechanism 100 is shown. The articulation mechanism 100 may be utilized to support a joint between adjacent elongated portions of large scale oilfield equipment. For example, a joint may be found between a frame 210, 335 and extendable or collapsable wings 330 or auger arms 275 relative thereto (see FIGS. 3A and 4A). Such an articulation mechanism 100 may be utilized to stably support the sizable weight of such features during extending or collapsing thereof. Once more, the mechanism 100 may provide secure immobilization or locking in place of such features even in absence of any ongoing extending or collapsing.

As shown in FIG. 1A, the mechanism 100 includes a screw device 110 that is shown in a retracted lateral position. More specifically, with respect to a surrounding extension housing 150 of the mechanism 100, the device 110 is shown substantially retracted thereinto. To the contrary, in the depiction of FIG. 1B, the screw device is shown noticeably extended laterally out of the housing 150.

As the screw device 110 moves laterally to varying degrees, from one position to another, the housing 150 utilizes rollers 140 to enhance stability of the device 110. Enhancing stability may be of substantial benefit where a significant load is secured to the exposed end 175 of the screw device 110. For example, in the embodiment shown, the exposed end 175 includes a clevis connection 185 for pivotally securing to a heavy articulated or elongated portion of equipment as alluded to above. Thus, during lateral movement of the screw device 110, a degree of stabilization is provided at one location by the noted rollers 140. The added stability here may substantially eliminate any bending load on the screw device 110 from the secured articulated portion of equipment as detailed below.

In addition to the stabilization provided by the rollers 140, the screw device 110 is laterally moved backward or forward into or out of the housing 150 by a screw jack 120. Thus, the engagement of a threaded region 112 of the screw device 110 with the screw jack 120 provides another location of stabilization for the device 110. That is, unlike the exposed end 175, the opposite end of the screw device 110 remains insecure relative another elongated portion of equipment such as a frame 210, 335, wing 330, or auger arm 275 (see FIGS. 3A and 4A). Instead, this other equipment portion may be pivotally secured to the housing 150 as detailed further below. Regardless, additional stability is provided to the screw device 110 through the engagement of the threaded region 112 with the screw jack 120. In the embodiment shown, the screw jack 120 may be of an about twenty ton to about forty ton variety, although screw jacks of other ratings may also be employed.

In the embodiment shown, the insecure end of the device 110 which may include the threaded region 112 may recede into a cylindrical protective covering 125. This covering 125 may serve to keep the surface of the threaded region 112 shielded from debris. However, in this embodiment, the covering 125 may not be relied upon for any substantial supportive functionality.

Utilizing a screw jack 120 to linearly or laterally move the screw device 120 between a retracted position as shown in FIG. 1A and an extended position as shown in FIG. 1B provides certain additional advantages. For example, unlike extending a conventional hydraulic arm, the need for a constant supply of power may be avoided due to the self-locking nature of the mechanism as detailed further below. Once more, the space requirements for a screw jack 120 are comparatively compact. That is, a large range of motion is available from the mechanism 100 via the screw jack 120. This is illustrated in the comparison of the different positions of the screw device 110 when moving from the retracted positon of FIG. 1A to the extended position of FIG. 1B. It is clear that nearly the entirety of the threaded region 112 advances through the screw jack 120 for the sake of a stroke that extends the device 110.

The self-locking nature of the screw jack 120 may be inherent in such device types depending on the gear ratio involved. For example, as indicated above, the threaded region 112 of the screw device 110 engages the jack 120 which is used to rotatably extend or retract the device 110 in a lateral fashion. More specifically, the jack 120 includes a bearing mounted rotatable nut (not shown) or other matching threaded feature about the threaded region 112. This feature is rotatably driven by a hydraulic or other conventional compact motor 130 to laterally extend or retract the screw device 110 depending on the direction of rotation of the feature. Thus, as is the case with such gear-driven mechanisms, a variety of gear ratio options may be available in driving such a rotation. For example, the gear ratio may be 2 to 1, 50 to 1, or any number of ratios in between or even outside of such ranges.

For embodiments detailed herein, the jack 120 is utilized to stably support opening, closing or otherwise supporting elongated equipment portions of potentially several thousand pounds in an environment involving a fair amount of vibration. Thus, it is advantageous to utilize a screw jack 120 which is likely to demonstrate a substantially "self-locking" nature. By way of specific example, in such an environment, a 30 ton jack 120 with a gear ratio of 32 to 1 would be substantially self-locking. That is, in spite of the weight and tension involved, and even the potential vibrating nature of the environment, the likelihood of the jack 120 being backdriven with the elongated equipment falling, lowering or becoming unsupported would be negligible.

Once more, this substantially self-locking nature of the articulation mechanism 100 does not require a constant power supply to achieve. Rather, the power supplied through the motor 130 may simply be turned off whenever the screw device 110 is in the appropriate lateral position and the joint will remain supported or "locked". This is illustrated in the embodiments detailed below where heavy elongated wings 330 are locked in place by an articulation mechanism 100 for sake of transport or where elongated auger arms 275 are locked in position by another mechanism 100 for delivery of aggregate (see FIGS. 4A and 4C).

In an embodiment, another stabilizing feature of the articulation mechanism 100 is found in the fact that the extension housing 150 may be substantially rectangular, for sake of accommodating rollers 140 at multiple flat surfaces thereof as shown. This rectangular shape of the housing 150 also receives a matching rectangular shape of the screw device 110. That is, while the threaded region 112 of the screw device 110 is provided for engaging the screw jack 120 as described above, it does not rotate as this function is provided by the jack 120 itself as described above. Therefore, a rectangular region 114 of the device 110 may be provided for securably moving linearly within the rectangular housing 150. Thus, as the device 110 moves from position to position, it does so stably with a reduced likelihood of rotation or other destabilizing motion.

Figure 2:
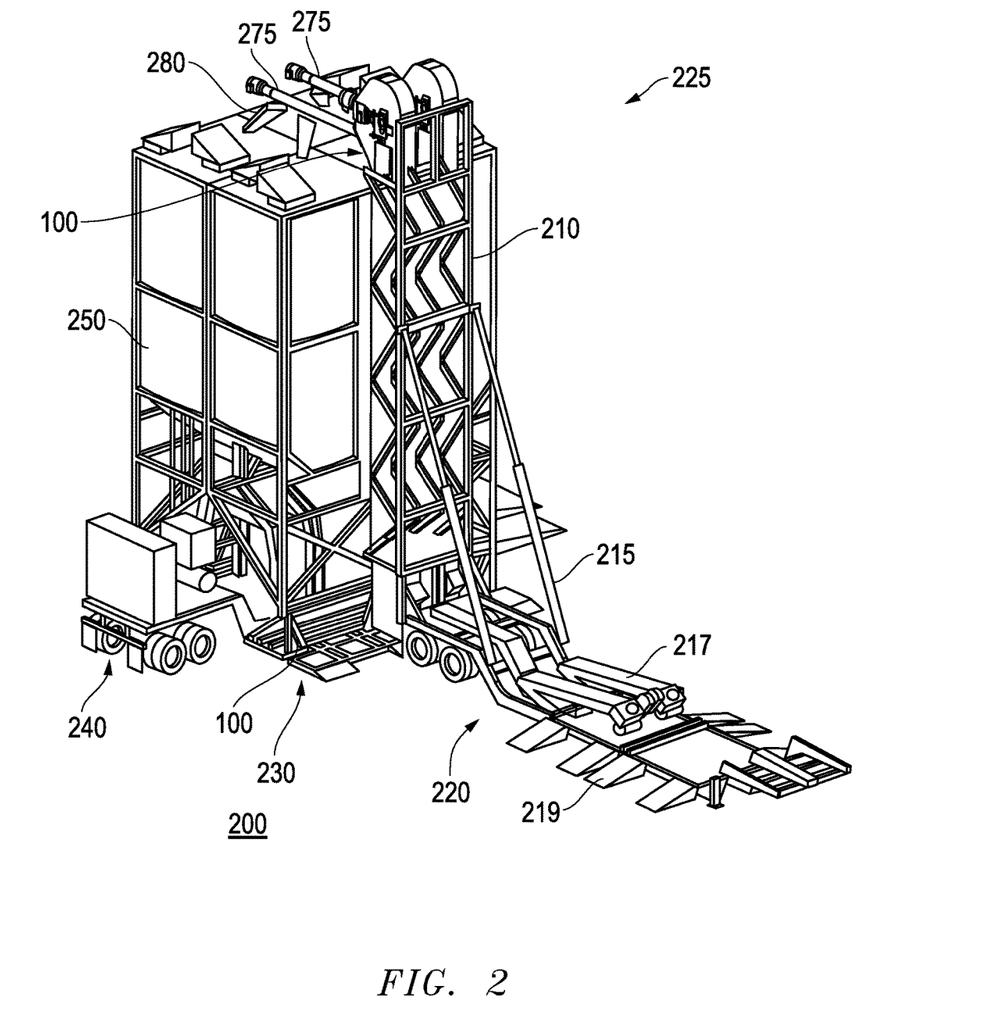
FIG. 2 is a perspective overview of an aggregate silo system with multiple hinge locations incorporating the mechanism with screw device of FIGS. 1A and 1B.

Referring now to FIG. 2, a perspective overview of an aggregate silo system 225 is shown. The system 225 includes multiple hinge locations where the articulation mechanism 100 of FIGS. 1A and 1B may be utilized. Specifically, with added reference to FIGS. 3C and 4C, a mobile base frame 230 and auger unit 220 are shown following tractor-type delivery with elongated equipment portions in the form of wings 330 and auger arms 275 are found. As alluded to above, using articulation mechanisms 100 as an aid to deploying these features may be of substantial benefit given their heavy articulated nature.

As a practical matter, safety concerns for operators at the worksite 200 are evident given the massive scale involved. For example, apart from the multiple ton mobile base frame 230 and auger unit 220, a comparably massive mobile mixing equipment 240 is provided for docking to and/or supporting several ton capacity silo units 250 which accommodate aggregate such as proppant. Thus, as each of these pieces of equipment is installed as shown, safe and secure measures may be taken to ensure operator safety as well as long term stability of the system 225. Along these lines, enhanced security is provided in large measure to the wings 330 and auger arms 275 via the articulation mechanisms 100.

Continuing with reference to FIG. 2, the silo system 225 is set up by delivery of the base or mobile base frame 230 to the worksite 200. Wings or extended bases 330 of the frame 230 are deployed to the position depicted with aid of an articulation mechanism 100. As detailed further below, this articulation mechanism 100 is of particular benefit during transport of the frame 230. Regardless, mobile mixing equipment 240 and auger unit 220 are positioned as shown. Specifically, the auger unit 220 is positioned in a collapsed form followed by extension of the auger arms 275 with aid of another articulation mechanism 100 and raising of an elevator 210 via hydraulic arms 215. Thus, at some point, delivery trucks may be driven over folding ramps 219 to drop proppant or other aggregate onto a conveyor belt 217 which sends the proppant over to the elevator 210 and eventually to the auger arms 275 and chutes 280 for filling of the silo 250. As a result, the in-place mixing equipment 240 may be used to provide a slurry of the proppant on an as needed and long term basis at the worksite 200.

In the embodiment shown, the conveyor belt 217 is folded prior to use. However, it may be unfolded for use as described. Additionally, in an embodiment, the belt 217 may be more of a telescoping configuration.

Figure 3A:
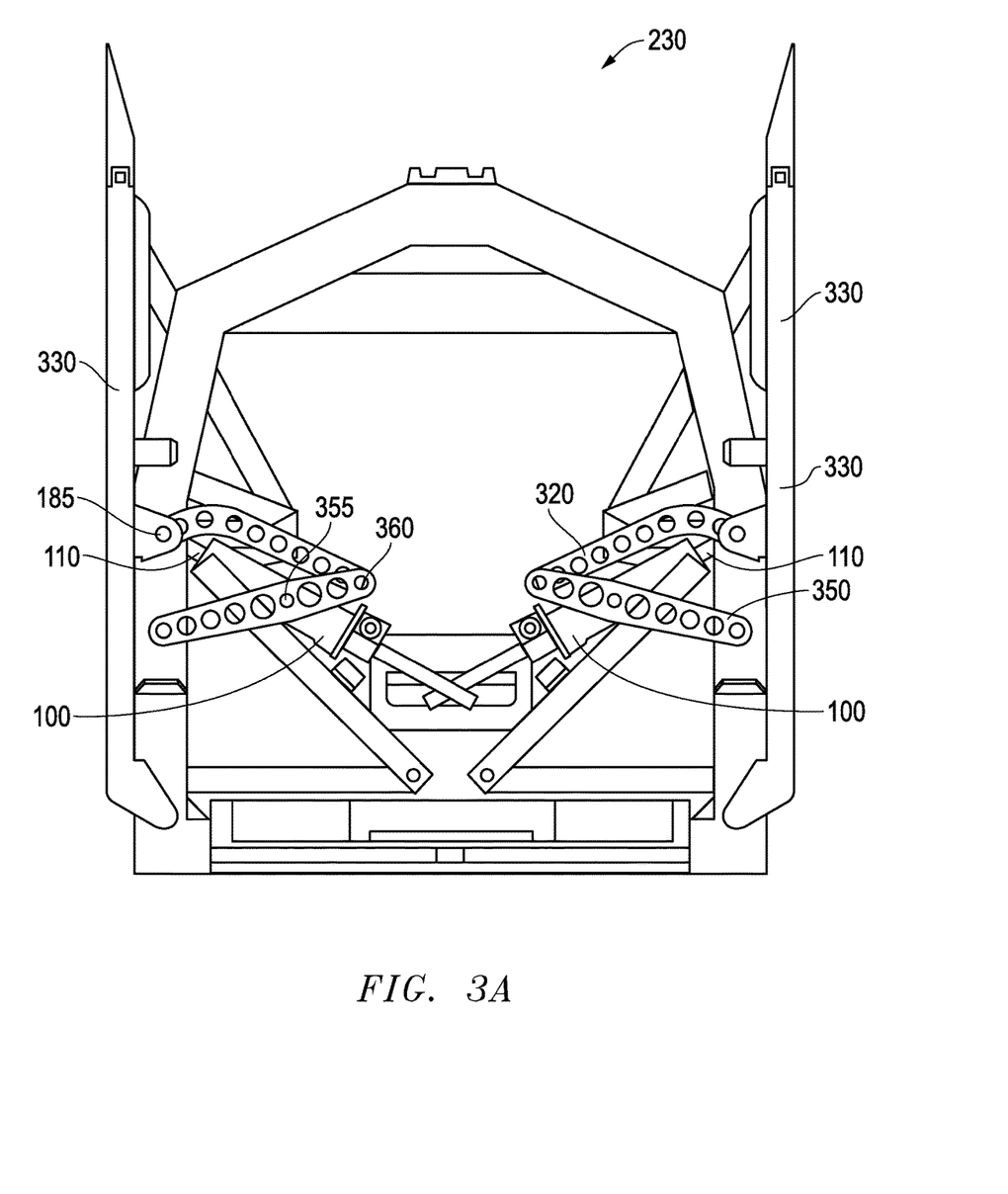
FIG. 3A is a rear view of a mobile base frame for the system of FIG. 2 with a screw device of the mechanism in a retracted and locked lateral position for frame transport.

Referring now to FIG. 3A, a rear view of a mobile base frame 230 is shown for the system 225 of FIG. 2. In this depiction, multiple articulation mechanisms 100 are shown with their screw devices 110 in a retracted and locked lateral position. That is, recalling that the mechanisms 100 may be self-locking in nature, they may be used to lock the heavy wings 330 in place for transport. Further, keeping in mind that the mobile base frame 230 may be a truck/tractor driven assembly of extremely high weight; as a matter of safety, the mechanisms 100 are configured such that maximum stability is provided during transport. For example, the wings 330 which are folded up for transport may each weigh 15,000 to 25,000 lbs. or more. Thus, it is advantageous during transport that the mechanisms 100 secure the wings 330 upright for transport while having the screw devices 110 retracted and of most secure and stabilized positioning within the extension housing 150 (e.g. see FIG. 1A). Indeed, even though the load of the wings 330 is likely to be minimal on the devices 110 during routine transport, the possibility of wind, accidents or other potential issues remain. Thus, maximum reliability and security of the mechanisms 100 in terms of retaining the wings 330 in a folded upright position as shown, is of particular benefit during transport.

Figure 3B:
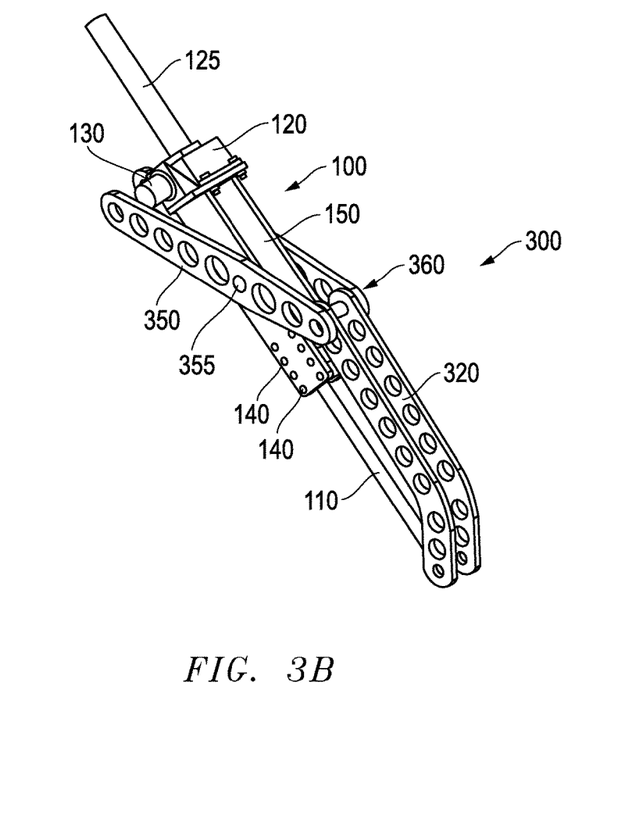
FIG. 3B is a perspective view of the articulation mechanism embodiment of FIG. 3A with the screw device in an extended lateral position.

Continuing now with added reference to FIG. 3B, a perspective view of one of the articulation mechanisms 100 of FIG. 3A is shown. Specifically, the mechanism 100 is shown with the screw device 110 shifted to an extended lateral position. In this depiction, the curved "boomerang" shape of supplemental links 320, 350 is apparent. That is, as the screw 110 extends from the housing 150 as driven by the motor 130 and screw jack 120, a joint 360 of these links 320, 350 opens up allowing them to provide added support. Specifically, a secondary link 320 is pivotally secured to the clevis connection 185 (see FIG. 1A) of the wing 330 whereas the primary link 350 is pivotally secured to the housing 150. Thus, added stability is provided as the wing 330 is unfolded from the transport orientation shown if FIG. 3A to the deployed positioning shown in FIG. 3C discussed below. It is of note that the primary link 350 is pivotally secured to the housing 150 at a substantially central location thereof. However, in other embodiments, such as the auger arms 275 discussed above and further below, the housing 150 may include pivotal connection at more of an offset location (e.g. see 180 of FIG. 4A).

Figure 3C:
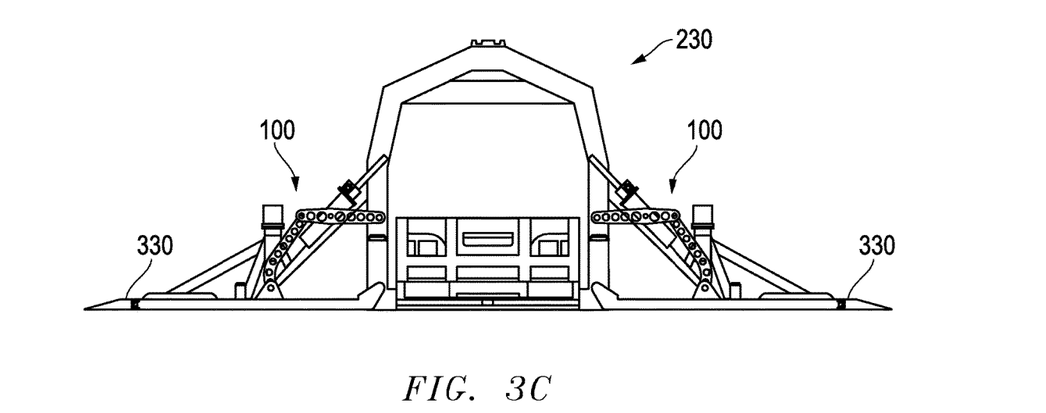
FIG. 3C is a rear view of the mobile base frame of FIG. 3A with the screw device in an extended lateral position for frame deployment.

Continuing now with added reference to FIG. 3C, a rear view of the mobile base frame 230 of FIG. 3A is shown with the screw device 110 in its fully extended lateral position and secured to the wings 330, now fully deployed. In this view, the full range of motion provided by the articulation mechanisms 100 is readily apparent. Additionally, it is worth noting that the maximum load placed on the articulation mechanisms 100 by the wings 330, just prior to the wings 330 reaching the ground for support, may approach 35,000 lbs. or more. Yet, at this time, the frame 230 is in position for deployment as opposed to on the road for transport. Thus, from a safety standpoint, this is a uniquely opportune time for the mechanisms 100 to experience such a load, if needed.

Figure 4A:
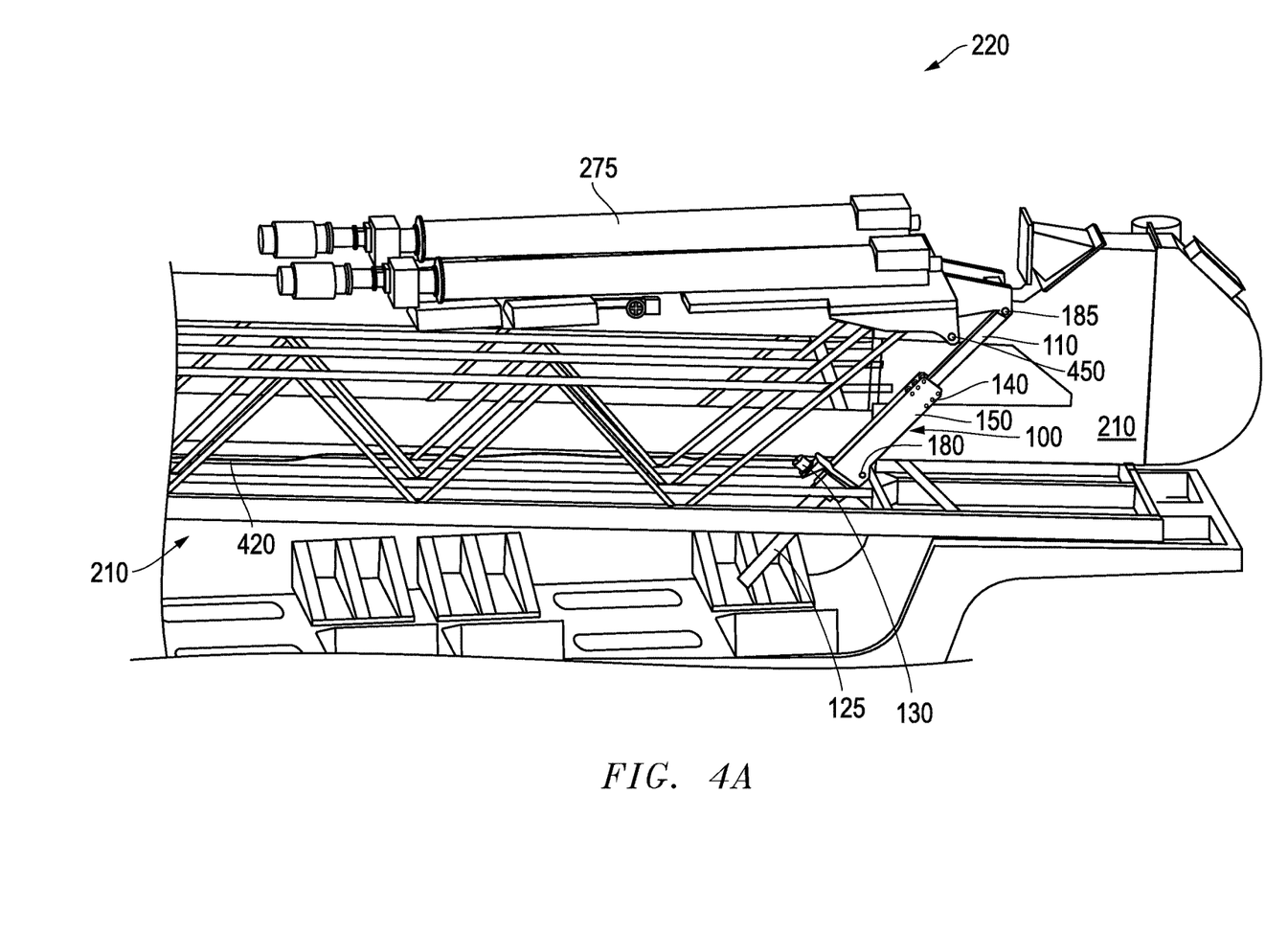
FIG. 4A is a side perspective view of a mobile auger unit for the system of FIG. 2 with a screw device of the mechanism in an extended lateral position for unit transport.

Continuing now with reference to FIG. 4A, a side perspective view of a mobile auger unit 220 for the system of FIG. 2 is shown. Specifically, the articulation mechanism 100 is depicted with the screw device 110 thereof in an extended lateral position. That is, unlike the screw device 110 for the articulation mechanism 100 of the base frame 230 of FIG. 3A, the device 110 for the auger unit 220 is extended during transport. This is because the heavy elongated auger arms 275 are already naturally horizontally secure during transport as shown, in contrast to the elongated wings 330 of FIG. 3A. As a result, the more stable and secure positioning of the screw device 110, retracted to within the housing 150 may instead be utilized where it is of greater advantage (e.g. when the arms 275 are locked open during use as shown in FIG. 4C).

Continuing with reference to FIG. 4A, as indicated above, the unit 220 is shown folded up for transport with the elevator 210 and arms 275 both horizontally secure to a mobile tractor bed. The screw jack 120 of the articulation mechanism 100 may be of a gear ratio to effectively lock the screw device 110 in position as shown. Specifically, the device 110 may hold the clevis connection 185 (see FIG. 1A) of the arms 275 in place, preventing any extending movement of the arms 275 about an elevator pivot location 450. Nevertheless, as alluded to above and detailed further below, once in position for deployment, hydraulic lines 420 may direct a hydraulic motor 130 at the screw jack 120 to retract the screw device 110 over the rollers 140 and into the housing 150. In an embodiment, the screw jack 120 may be driven by an electric motor, a pneumatic motor, or manually driven with a crank (of appropriate size for the torque required to retract the screw drive 110), as will be appreciated by those skilled in the art.

Figure 4B:
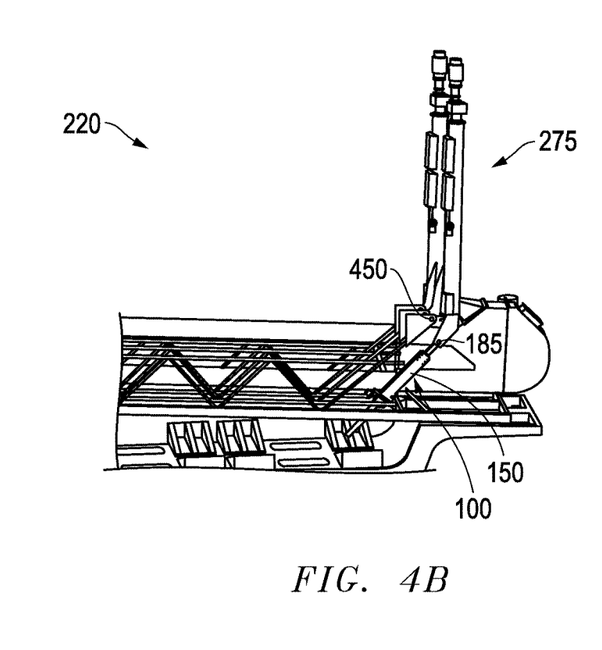
FIG. 4B is a side perspective view of the articulation mechanism embodiment of FIG. 4A with the screw device in a retracted lateral position for auger extension from the unit.

With added reference to FIG. 4B, retracting the screw device 110 into the housing 150 may take place until the arms 275 are raised and locked into the vertical position shown. Of course, in other embodiments, the nature of the articulation mechanism 100 is such that the arms 275 may be raised beyond vertical or 90° should this be desirable. Regardless, as the arms 275 raise, they are articulated about the noted elevator pivot location 450 and the threaded region 112 of the screw device 110 is pulled into the protective covering 125 as described above. At this time, the housing 150 may rotate to a degree about the offset clevis 180 as also described above. Perhaps most notably though, the articulation mechanism 100 achieves this motion while taking on a significant load. For example, each arm 275 may be 12 to 14 feet long and weigh several thousand pounds. Just as the arms 275 begin to raise, the load on the screw device 110 and mechanism 100 from the arms 275 may exceed 20,000 lbs., eventually settling down to a load of 5,000-10,000 lbs. once raised to a rested vertical position as shown. Nevertheless, the unique nature of the screw jack 120 is such that sufficient power for the maneuver may be readily obtained from a small scale, compact hydraulic motor 130 as shown.

Figure 4C:
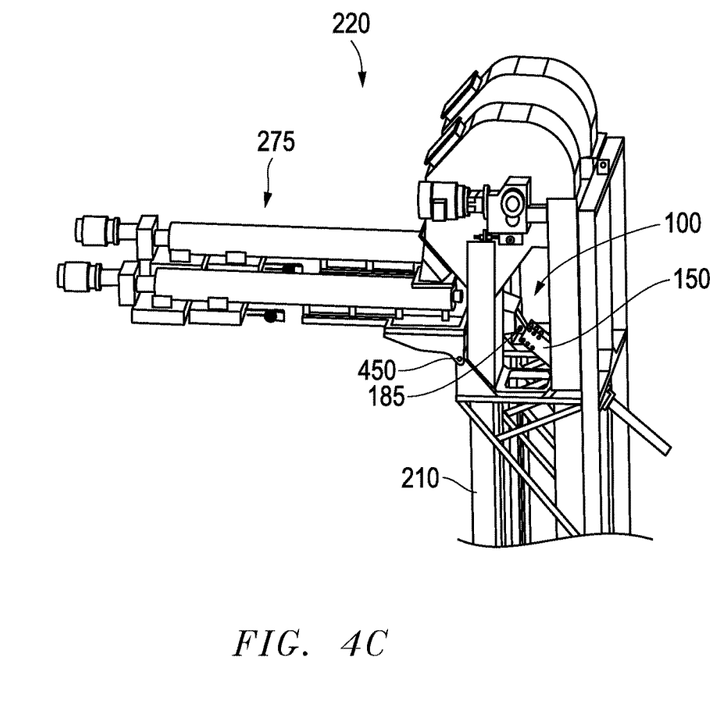
FIG. 4C is a side perspective view of the unit of FIG. 4A raised to a vertical position with the articulation mechanism locked for auger security.

Referring now to FIG. 4C, a side perspective view of the unit 220 of FIG. 4A is shown raised to a vertical position. That is, the elevator 210 of the unit 220 is fully raised up while the articulation mechanism 100 remains locked in place, allowing the auger arms 275 to take on a horizontal orientation.

With added reference to FIG. 2, raising of the elevator 210 in this manner may be achieved through conventional hydraulic arms 215. Regardless, once in position, the auger arms 275 may be used to deliver aggregate such as proppant to the silos 250 of the system 225. Thus, the load on the articulation mechanism 100 may be quite significant. For example, holding the arms 275 alone in this manner may place several thousand pounds of tension on the mechanism 100. However, once filled with a proppant such as bauxite, the overall tension may exceed 45,000 lbs. and for an extended period of use (e.g. as the proppant is delivered to the system 225). Thus, in this particular embodiment, it is advantageous to extend the arms 275 by retraction of the screw device 110 into the housing 150 where maximum stability is achieved for the mechanism 100.

Figure 5:
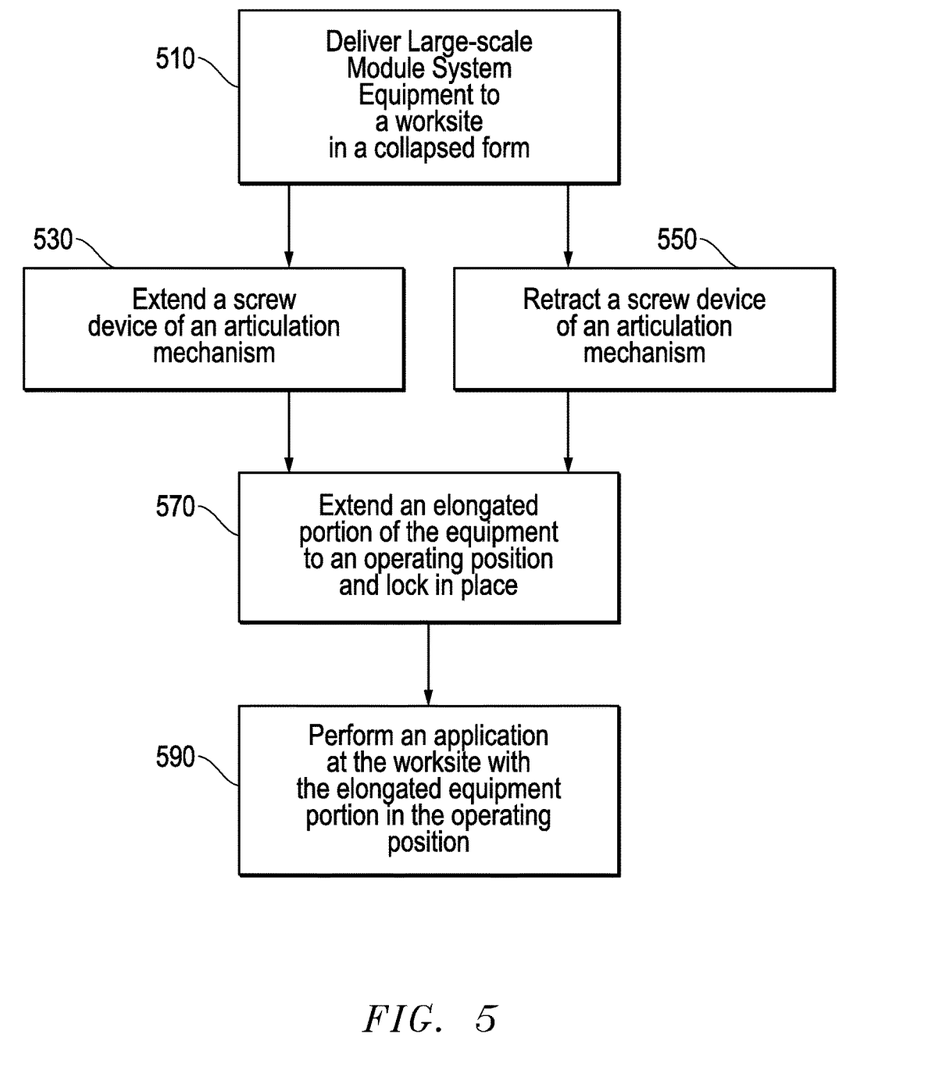
FIG. 5 is a flow-chart summarizing an embodiment of employing an articulation mechanism at an interface between aggregate delivery equipment portions.

Referring now to FIG. 5, a flow-chart is shown summarizing an embodiment of employing an articulation mechanism at a joint between an elongated portion and other aggregate delivery equipment portions. Specifically, large-scale equipment may be delivered to a worksite in a collapsed fashion as indicated at 510. In cases where it is most advantageous for the delivery to include use of an articulation mechanism with a retracted screw device, the device may then be extended as indicated at 530 (e.g. see the wings 330 of FIG. 2). Alternatively, in situations where it is more advantageous for the screw device to be retracted during operation, the mechanism may be extended during delivery (see the arms 275 of FIG. 2). Thus, upon delivery, the screw device may be retracted as indicated at 550.

In response to appropriate extending or retracting of the screw device, the elongated portion of the equipment may be actuated into an operating position as indicated at 570. For embodiments described herein, this may include mobilizing a support frame or achieving a horizontal position for auger arms as noted. Regardless, as indicated at 590, this may be followed by an appropriate worksite application such as securing silos at a mobilized frame or delivering proppant thereto from auger arms.

Embodiments described above allow for a more practical utilization of on-site silos filled with proppant. That is, challenges associated with raising pre-filled silos may be avoided while also allowing for a larger scale silo system. Specifically, the modular nature of the larger scale system is supported by the use of compact articulation mechanisms that render the compact transport and subsequent deployment of sizable equipment more practical. In spite of the potentially tens of thousands of pounds involved, embodiments of articulation mechanisms detailed hereinabove allow for deployment of a modular base frame, auger arms and other equipment in a compact and practical manner.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. For example, in the embodiments detailed above, a single articulation mechanism is depicted for a given base wing or even for a pair of auger arms. However, in other embodiments, the numbers may differ. For example, multiple articulation mechanisms may be used per base wing or each auger arm outfitted with its own dedicated mechanism. Furthermore, the foregoing description should not be read as pertaining only to the precise structures described and shown in the accompanying drawings, but rather should be read as consistent with and as support for the following claims, which are to have their fullest and fairest scope.

I claim:

1. A method of utilizing a large-scale aggregate management system at a worksite, the method comprising:
   delivering mobile equipment of the system to the worksite with an elongated portion of the equipment in a collapsed position relative another portion of the equipment;
   employing a screw jack of an articulation mechanism to laterally move a screw device by rotationally operating the screw jack, via a motor, relative to a threaded region of the screw device so as to extend or retract the screw device with respect to a screw device housing, an end of the screw device being pivotally secured to the elongated portion and the screw device housing being pivotally coupled to the other portion of the equipment, the lateral movement of the screw device causing the elongated portion of the equipment to pivot from the collapsed position to an operating position relative the another portion of the equipment, the screw device supporting a load from the elongated equipment during movement from the collapsed position to the operating position;
   holding, with the screw device, the elongated portion in the operating position in a substantially self-locking manner; and
   operating the mobile equipment at the worksite, while the elongated portion of the equipment is in the operating position, to deliver aggregate for a well related application.

2. The method of claim 1 further comprising:
   holding, with the screw device, the elongated portion in the in the collapsed position in a substantially self-locking manner; and
   transporting the mobile equipment prior to delivering.

3. The method of claim 2 wherein holding the elongated portion in the collapsed position comprises maintaining the screw device in a retracted position relative the housing.

4. The method of claim 3 wherein the mobile equipment is a mobile base frame coupled to an aggregate silo at the worksite, wherein the elongated portion thereof is a wing with the operational position comprising the wing deployed to the ground, and wherein the collapsed position is the wing in a folded upright position relative to the ground.

5. The method of claim 2 wherein holding the elongated portion in the collapsed position comprises maintaining the screw device in an extended position relative the housing.

6. The method of claim 5 wherein the mobile equipment is a mobile auger unit positioned relative to an aggregate silo such that operation of the mobile auger unit discharges aggregate into the silo.

7. The method of claim 6 wherein the collapsed position is a horizontal orientation relative to the ground and wherein the operating position is a vertical position relative to the ground, wherein the elongated portion of the equipment comprises at least one auger arm for delivering the aggregate to the silo, the method further comprising operating an elevator of the auger unit coupled to the auger arm to a vertical position after holding the auger arm in the operating position.

8. The method of claim 1, further comprising forming the screw device housing with a rectangular cross-section for receiving a corresponding rectangular section of the screw device.

9. The method of claim 1, further comprising supporting the screw device on a plurality of rollers.

10. The method of claim 1, wherein rotationally operating the screw jack, via a motor, comprises using a hydraulic motor.

11. The method of claim 1, further comprising coupling the screw device housing to the other portion of the equipment via an offset clevis connection.

12. The method of claim 1, further comprising coupling the screw device housing to the other portion of the equipment via a supplemental link.

13. The method of claim 1, wherein operating comprises delivering aggregate in the form of proppant for use in a fracturing operation.

* * * * *